(12) United States Patent
Korus

(10) Patent No.: US 10,710,110 B2
(45) Date of Patent: Jul. 14, 2020

(54) OUTLET FITTING FOR FLUID-CARRYING CONDUIT

(71) Applicant: LINDSAY CORPORATION, Omaha, NE (US)

(72) Inventor: Thomas J. Korus, Lindsay, NE (US)

(73) Assignee: Lindsay Corporation, Omaha, NE (US)

( * ) Notice: Subject to any disclaimer, the term of this patent is extended or adjusted under 35 U.S.C. 154(b) by 539 days.

(21) Appl. No.: 15/451,618

(22) Filed: Mar. 7, 2017

(65) Prior Publication Data

US 2018/0259108 A1    Sep. 13, 2018

(51) Int. Cl.
*F16L 41/14* (2006.01)
*B05B 15/65* (2018.01)
*B05B 15/658* (2018.01)

(52) U.S. Cl.
CPC ............ *B05B 15/65* (2018.02); *B05B 15/658* (2018.02); *F16L 41/14* (2013.01)

(58) Field of Classification Search
CPC .................................. F16L 41/14; F16L 41/08
USPC ............ 285/139.3, 196, 139.2, 140.1, 141.1
See application file for complete search history.

(56) References Cited

U.S. PATENT DOCUMENTS

| | | | | |
|---|---|---|---|---|
| 1,222,806 A * | 4/1917 | Schmitt | ................... | F16L 41/14 285/206 |
| 1,461,385 A * | 7/1923 | Falor | ..................... | F16L 37/025 285/332.2 |
| 2,117,111 A * | 5/1938 | Bills | ........................ | F16L 5/00 285/206 |
| 3,841,667 A * | 10/1974 | Sands | ..................... | F16L 41/14 285/39 |
| 4,411,458 A * | 10/1983 | Strunk | .................. | F16L 41/088 285/196 |
| 2002/0189674 A1* | 12/2002 | Meeder | ................. | E03C 1/0401 137/359 |

* cited by examiner

*Primary Examiner* — David Bochna
*Assistant Examiner* — James A Linford
(74) *Attorney, Agent, or Firm* — Hovey Williams LLP

(57) ABSTRACT

An outlet fitting broadly comprises a coupler, a plug, and a gasket. The coupler engages a conduit opening of a conduit and includes an aft section, a forward section, and a radially extending flange bisecting the aft and forward sections. The aft section includes a narrowing inner surface forming a fluid passageway. The flange includes an upper surface for abutting the conduit near the conduit opening. The plug has a laterally elongated longitudinally extending central aperture. The aft section is inserted into the conduit opening and a tool inserted into the central aperture draws the plug towards the forward section and expands the aft section into secure engagement with the conduit. The gasket is also urged against the periphery of the conduit opening and forms a seal between the coupler and the conduit.

10 Claims, 6 Drawing Sheets

OUTLET FITTING FOR FLUID-CARRYING CONDUIT

BACKGROUND

Mobile irrigation systems include a number of fluid-carrying conduits for distributing water and other fluids to crops. Outlet fittings are typically attached to the conduits so that external sprinklers or other fluid emitters may be quickly and easily connected to the conduits. Many conduits are made of materials that contain polyolefin or polyethylene, and connecting outlet fittings to such materials is difficult without using harsh, environmentally-damaging chemicals or high-temperature welding or other processes, all of which are difficult to use and control in outdoor environments. Further, outlet fittings must be liquid-sealed, a process which is also difficult to perform in the field. Thus, outlet fittings are typically attached to conduits in a factory, warehouse, or other environmentally controlled setting. However, pre-attaching outlet fittings in a factory doesn't allow end-users to customize conduits in the field for specific applications.

It is becoming common to retrofit existing mobile irrigation systems with new fluid-carrying conduits suspended below their original conduits. These suspended conduits are typically formed from lengths of polyethylene pipes purchased from local suppliers that are heat fused together and then suspended from the original conduits with cables or chains. The pipes typically have no outlet fittings or holes for the outlet fittings, so the holes must be cut in the pipes and the outlet fittings must be installed in the field. Thus, the above-described chemicals and welding processes cannot be safely and practically used for such retrofits.

SUMMARY

The present invention solves the above-described problems and provides a distinct advance in the art of outlet fittings for irrigation systems by providing an outlet fitting for a fluid-carrying conduit that can be quickly and effectively attached in the field without the use of environmentally-damaging chemicals or high-temperature welding or other processes.

The outlet fitting is configured to be inserted in an opening of a fluid-carrying conduit so that a sprinkler head, hose, or other fluid emitter may be attached to the conduit. An embodiment of the outlet fitting broadly comprises a coupler, a plug, and a gasket.

The coupler includes an aft section, a forward section, and a radially extending flange that bisects the aft and forward sections. The aft section is configured to be inserted in the conduit opening and includes an inner surface and an outer surface. The inner surface has internal threading or other geometry for engaging the plug as described below and forms a fluid passageway out of the conduit. The diameter of the inner surface decreases from the outer edge of the coupler towards the center of the coupler. The outer surface is configured to expand outwardly when the plug is drawn into the coupler so as to engage the periphery of the conduit opening as described below. The forward section extends from the aft section away from the conduit and includes an inner surface and an outer surface. The inner surface is in fluid communication with the inner surface of the aft section to form a fluid passageway out of the conduit and has internal threading or other geometry for engaging the fluid emitter as described below. The outer surface may have a polygonal shape with several straight sides so it can be gripped by a wrench or other tool as described below. The flange includes an upper surface configured to abut the outer wall of the conduit and an opposite lower surface.

The plug is configured to be threaded into or otherwise drawn into the aft section of the coupler and comprises opposing aft and forward ends, an outer surface, and a central aperture. The aft and forward ends are circular or otherwise match the geometry of the inner surface of the coupler. The outer surface widens in diameter from the forward end to the aft end. This allows the plug to be partially threaded into the coupler without expanding the outer surface of the aft section of the coupler. The outer surface has external threading or other geometry for engaging the threading or other geometry of the coupler as described below. The central aperture extends between the aft and forward ends to form a fluid passageway through the plug.

The gasket is positioned around the aft section of the coupler for creating a seal between the coupler and the periphery of the conduit opening. The gasket may be a rubber O-ring, sealant, or the like.

To attach the outlet fitting in the conduit opening, the gasket is first positioned around the aft section of the coupler. The plug is then partially inserted into the aft section of the coupler. The aft section, plug, and gasket are then inserted into the conduit opening such that the flange abuts the conduit and the gasket abuts the periphery of the conduit opening. Since the plug is only partially threaded into the coupler at this point, it has not expanded the aft section of the coupler yet, so the coupler and plug fit within the conduit opening.

A tool such as a flathead screwdriver is then inserted into the central aperture and rotated to pull the plug further into the aft section of the coupler. As the plug is pulled further into the coupler, it expands the aft section of the coupler until at least a portion of the outer surface of the aft section and the attached gasket firmly contact the periphery of the conduit opening. In this way, the expanded aft section secures the coupler in the conduit opening and the gasket forms a seal between the outlet fitting and the conduit opening. The fluid emitter is then connected to the coupler by inserting an end of the fluid emitter in the forward section of the coupler and turning or urging the end of the fluid emitter into engagement with threading or other geometry of the coupler.

The above-described outlet fitting provides several advantages over conventional fittings. For example, the outlet fitting can be attached completely from the outside of the conduit without the use of complicated tools and without welding, heat sealing, or any other expensive or time consuming procedure. The outlet fitting can be inserted into the conduit opening as a cohesive assembly, which ensures that individual components of the assembly do not separate and become loose or lost inside the conduit. The coupler is positively secured in the conduit opening and the gasket ensures a homogenous seal between the outlet fitting and the conduit.

Another embodiment broadly comprises a coupler, a plug, a gasket, and a flare collar. The coupler includes an aft section, a forward section, and a radially extending flange and is similar to the coupler described above except that the inner surface of the aft section of the coupler has a substantially uniform diameter.

The plug fits within the aft section of the coupler and comprises opposing aft and forward ends, an outer surface, a central aperture, and a radially extending flange. The plug is similar to the plug described above except that the outer surface has a substantially uniform diameter. The flange extends from the aft end and is configured to abut the flare collar and impart an axial force thereto.

The gasket is similar to the gasket described above except that a distal end of the gasket tapers inwardly. The gasket may be an O-ring, sealant, or the like.

The flare collar is an annular ring including a distal end configured to abut the flange of the plug and a proximal end configured to abut the distal end of the gasket. The proximal end tapers outwardly for promoting outward expansion of the flare collar as described below. The flare collar may be formed of a malleable metal or similar material.

To attach the outlet fitting in the conduit opening, the gasket is first positioned around the aft section of the coupler. The plug is then partially inserted into the aft section of the coupler. The aft section, the plug, and the gasket are then inserted into the conduit opening such that the flange abuts the outer wall of the conduit and the gasket abuts the periphery of the conduit opening.

A tool such as a flathead screwdriver is then inserted into the central aperture and rotated to pull the plug further into the aft section of the coupler. As the plug is pulled further into the coupler, the flange of the plug forces the flare collar towards the gasket and the gasket urges the proximal end of the flare collar to radially expand outwardly until the flare collar firmly contacts the periphery of the conduit opening. In this way, the expanded flare collar secures the coupler in the conduit opening. The fluid emitter is then connected to the coupler by inserting an end of the fluid emitter in the forward section of the coupler and turning or urging the end of the fluid emitter into engagement with threading or other geometry of the coupler.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 2:
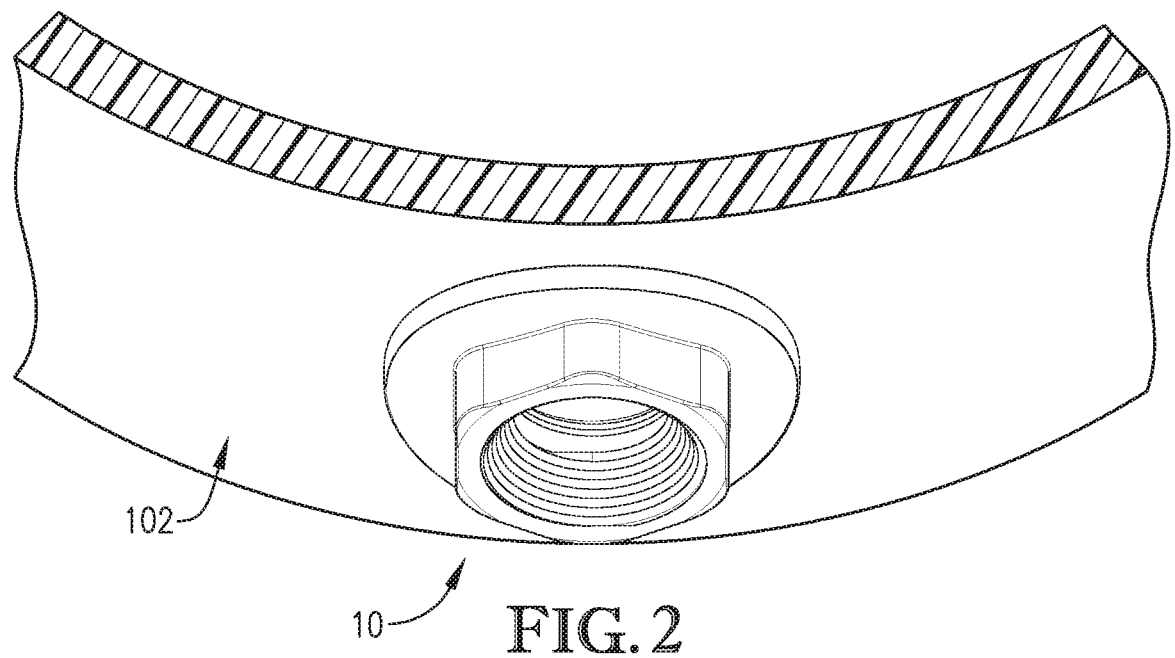
FIG. 2 is a partial bottom perspective view of the outlet fitting of FIG. 1.
Figure 1:
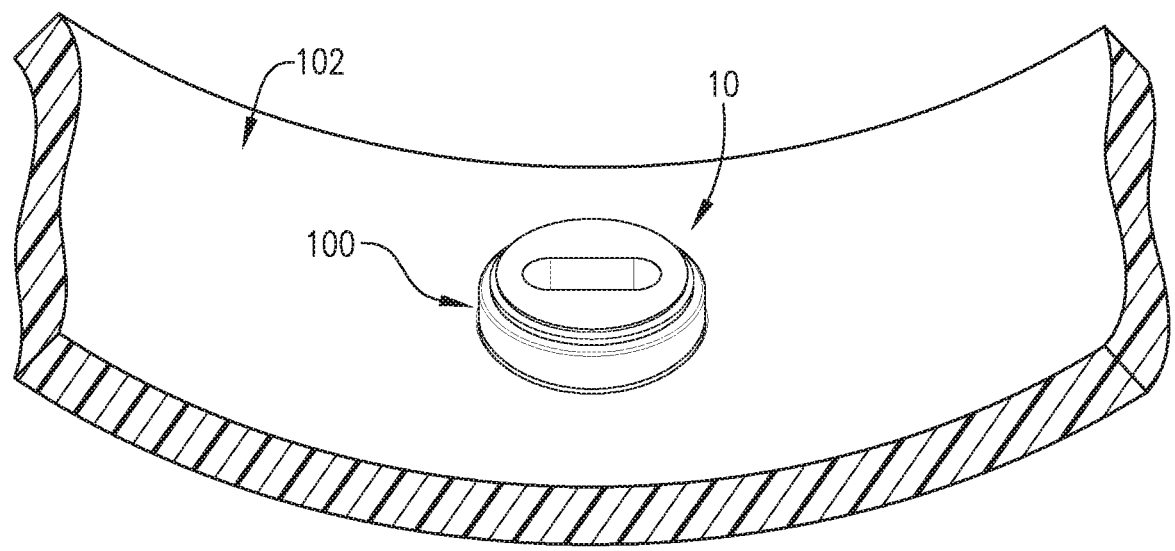
FIG. 1 is a partial top perspective view of an outlet fitting constructed in accordance with an embodiment of the invention.
Figure 3:
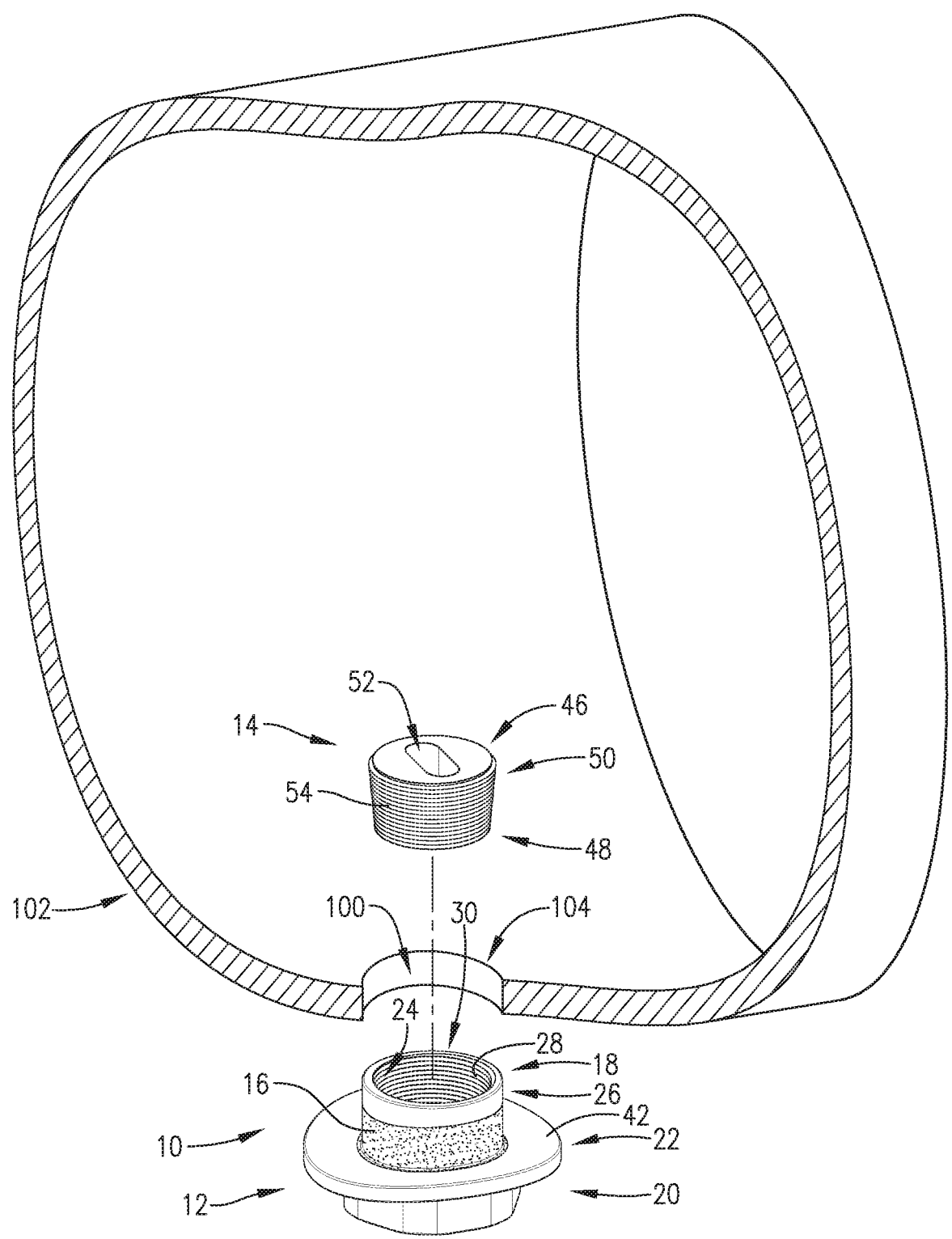
FIG. 3 is an exploded view of the outlet fitting of FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to the FIGS. 1-5, an outlet fitting 10 constructed in accordance with an embodiment of the invention is illustrated. The outlet fitting 10 broadly comprises a coupler 12, a plug 14, and a gasket 16.

The coupler 12 engages and fits within a conduit opening 100 of a conduit 102 and broadly comprises an aft section 18, a forward section 20, and a radially extending flange 22 that bisects the aft and forward sections 18, 20. The aft section 18 includes an inner surface 24 and an outer surface 26. The inner surface 24 includes plug engaging geometry 28 and forms a fluid passageway 30. The diameter of the inner surface 24 decreases from a distal end of the coupler 12 towards the center of the coupler 12. The plug engaging geometry 28 may be helical threading, radially extending barbs (similar to hose barbs), a radially extending neck, or other similar geometry for engaging outer features of the plug 14. The fluid passageway 30 extends through the coupler 12 for allowing fluid to pass therethrough.

The outer surface 26 includes a groove 32 and a radially extending lip 34. The groove 32 extends annularly around the aft section 18 between the flange 22 and the radially extending lip 34 and is configured to receive the gasket 16 therein. The radially extending lip 34 may extend annularly around the aft section 18 and is configured to positively engage a periphery 104 of the conduit opening 100 when the coupler 12 is fitted in the conduit opening 100. The radially extending lip 34 may also form the aft boundary of the groove 32 to retain the gasket 16 in the groove 32. The outer surface 26 of the aft section 18 may be circular or any other suitable shape to match the shape of the conduit opening 100. The outer surface 26 is configured to expand outwardly when the plug 14 is drawn into the coupler 12 so as to engage the periphery 104 of the conduit opening 100 as described in more detail below.

The forward section 20 extends from the aft section 18 and includes an inner surface 36 and an outer surface 38. The inner surface 36 may include connecting geometry 40 for connecting a fluid emitter (e.g., sprinkler, valve, hose, hose connector, etc.) to the coupler 12. The inner surface 36 fluidly extends from the inner surface 24 of the aft section 18 such that the fluid passageway 30 extends entirely through the coupler 12. The connecting geometry 40 may be helical threading, a hose barb, or any other suitable connector. The outer surface 38 may have a polygonal shape with several straight sides or any other suitable shape so it can be gripped by a wrench or other tool as described below.

The radially extending flange 22 bisects the aft section 18 and the forward section 20 and includes opposing upper and lower surfaces 42, 44. The upper surface 42 may be saddle shaped for abutting and conforming to a cylindrical shape of the conduit 102. The saddle shape may also prevent rotation of the coupler in the conduit opening 100 of the conduit 102.

The plug 14 broadly comprises opposing aft and forward ends 46, 48, an outer surface 50, and a central aperture 52. The aft end 46 faces inside the conduit 102 and the forward end 48 faces outside the conduit 102 when the outlet fitting 10 is installed in the conduit 102. The outer surface 50 extends from the aft end 46 to the forward end 48 and may include coupler engaging geometry 54 such as helical threading, radially extending barbs (similar to hose barbs), a radially extending neck, or other similar features for engaging the plug engaging geometry 28 of the aft section 18 of the coupler 12 and drawing the plug 14 into the aft section 18 as described in more detail below. The outer surface 50 may widen in diameter from the forward end 48 to the aft end 46. For example, the outer surface 50 may have a frusto-conical shape. This allows the plug 14 to be partially threaded into the coupler 12 without expanding the outer surface 26 of the coupler 12. The central aperture 52 extends longitudinally through the plug 14 from the aft end 46 to the forward end 48 for allowing fluid to pass therethrough and is configured to receive an end of a tool therein for urging the plug 14 towards the forward section 20 of the coupler 12. To that end, the central aperture 52 may be laterally elongated or may have other geometry for being rotationally engaged by the tool. Alternatively, the central aperture 52 may allow the tool to be inserted therethrough so that features of the tool can engage the aft end 46 of the plug 14.

The gasket 16 conforms to the groove 32 (or other geometry of the coupler 12) and/or periphery 104 of the conduit opening 100 so as to ensure a strong and consistent seal between the coupler 12 and the conduit 102. The gasket 16 may be a rubber O-ring, sealant, or any other suitable watertight component.

Figure 4:
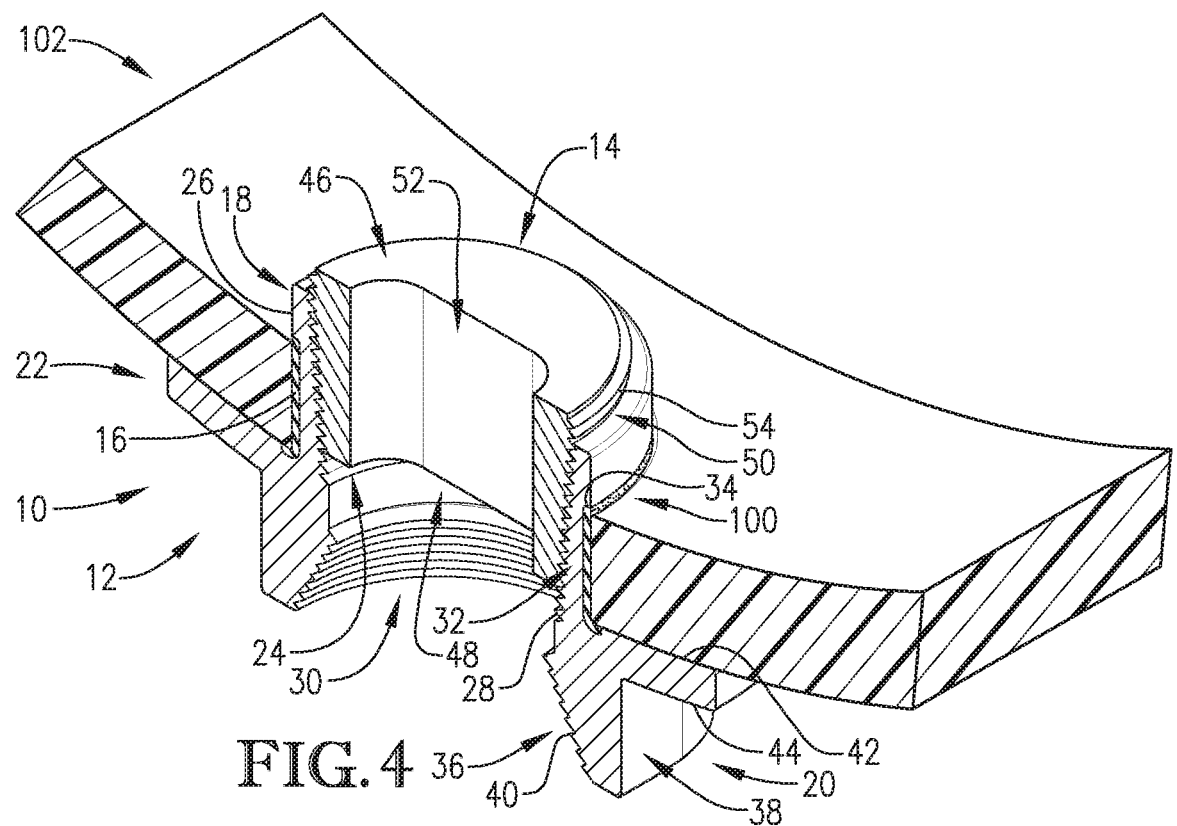
FIG. 4 is a partial cutaway perspective view of the outlet fitting of FIG. 1 unseated in a conduit opening of a conduit.

Use of the outlet fitting 10 will now be described in more detail. First, the gasket 16 may be positioned in the groove 32 around the aft section 18 of the coupler 12 and the plug 14 may be partially inserted into the aft section 18. The aft section 18 of the coupler 12, the plug 14, and the gasket 16 may then be inserted into the conduit opening 100 such that the flange 22 is positioned against the conduit 102 and the gasket 16 is adjacent the periphery 104 of the conduit opening 100 (FIG. 4). Since the plug 14 is only partially threaded into the coupler 12 at this point, it has not expanded the aft section 18 of the coupler 12 yet, so the coupler 12 and the plug 14 fit within the conduit opening 100.

Figure 5:
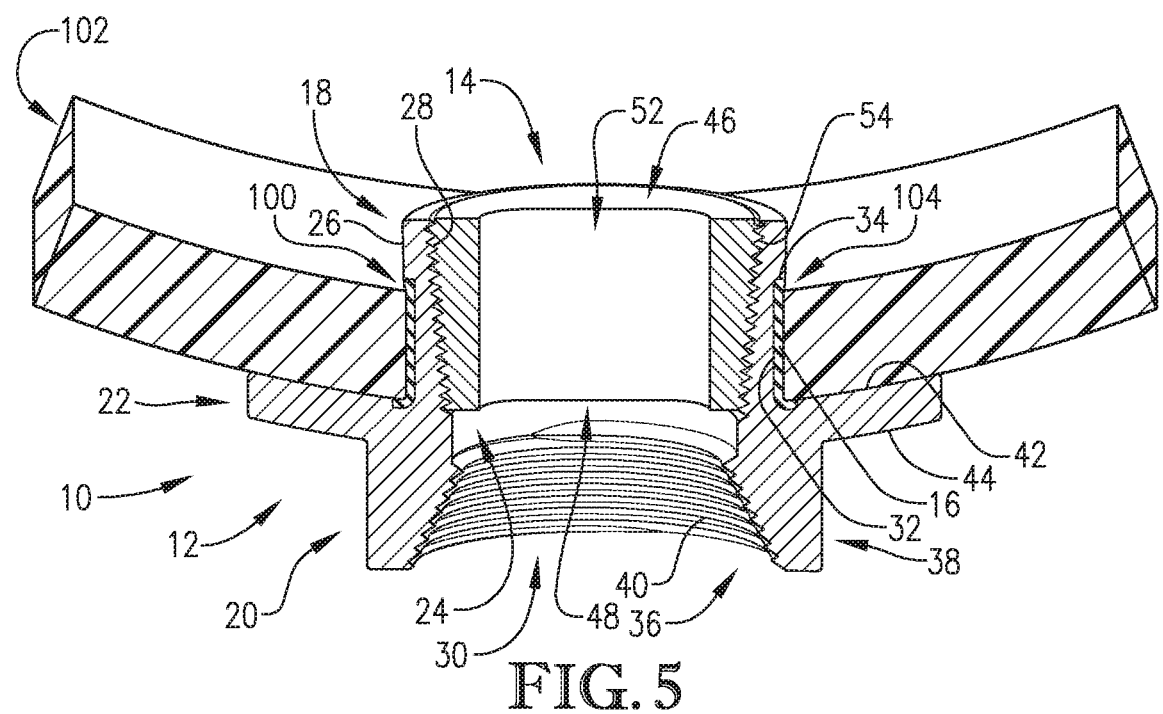
FIG. 5 is a partial cutaway perspective view of the outlet fitting of FIG. 1 seated in the conduit opening of the conduit.

A tool such as a flathead screwdriver may then be inserted into the central aperture 52 and rotated to pull the plug 14 further into the aft section 18 of the coupler 12. As the plug 14 is pulled further into the coupler 12, it radially expands the aft section 18 of the coupler 12 until at least a portion of the outer surface 26 of the aft section 18 and the attached gasket 16 firmly contact the periphery 104 of the conduit opening 100 (FIG. 5). In this way, the radially expanded aft section 18 secures the coupler 12 in the conduit opening 100. To that end, the radially extending lip 34 may positively secure the coupler 12 in the conduit opening 100.

The gasket 16 forms a seal between the coupler 12 and the conduit opening 100. To that end, the gasket 16 may morph around the periphery 104 of the conduit opening 100 to form a more secure seal. The seal may withstand up to 120 pounds per square inch of pressure.

A fluid emitter may then be connected to the forward section 20 of the coupler 12 via the connecting geometry 40. For example, a sprinkler may be attached to the connecting geometry 40 of the forward section 20 by tightening a connector of the sprinkler onto helical threading of the forward section 20 of the coupler 12.

In some embodiments in which the coupler 12 and the plug 14 engage each other with geometry other than helical threading, the tool may be T-shaped or L-shaped and may be inserted through the central aperture 52 and turned so that the end of the tool engages the aft end 46 of the plug 14. The tool may then be pulled towards the forward section 20 of the coupler 12 to shift the plug 14 towards the forward section 20. The engaging geometry of the coupler 12 and plug 14 radially expand the aft section 18 of the coupler 12 and prevent the plug 14 from backing out of the coupler 12 so as to secure the coupler 12 in the conduit opening 100.

The above-described outlet fitting 10 provides several advantages over conventional fittings. For example, the outlet fitting 10 can be attached completely from the outside of the conduit 102 without the use of complicated tools or time-consuming procedures. The outlet fitting 10 can be attached to the conduit 102 without welding, heat sealing, or any other expensive or time consuming treatment. The outlet fitting 10 can be inserted into the conduit opening 100 as a cohesive assembly, which ensures that individual components of the assembly do not separate and become loose or lost inside the conduit 102. The radially extending lip 34 of the coupler 12 positively secures the coupler 12 in the conduit opening 100. The outlet fitting 10 ensures a homogenous seal and does not develop failure points or leaks.

Figure 6:
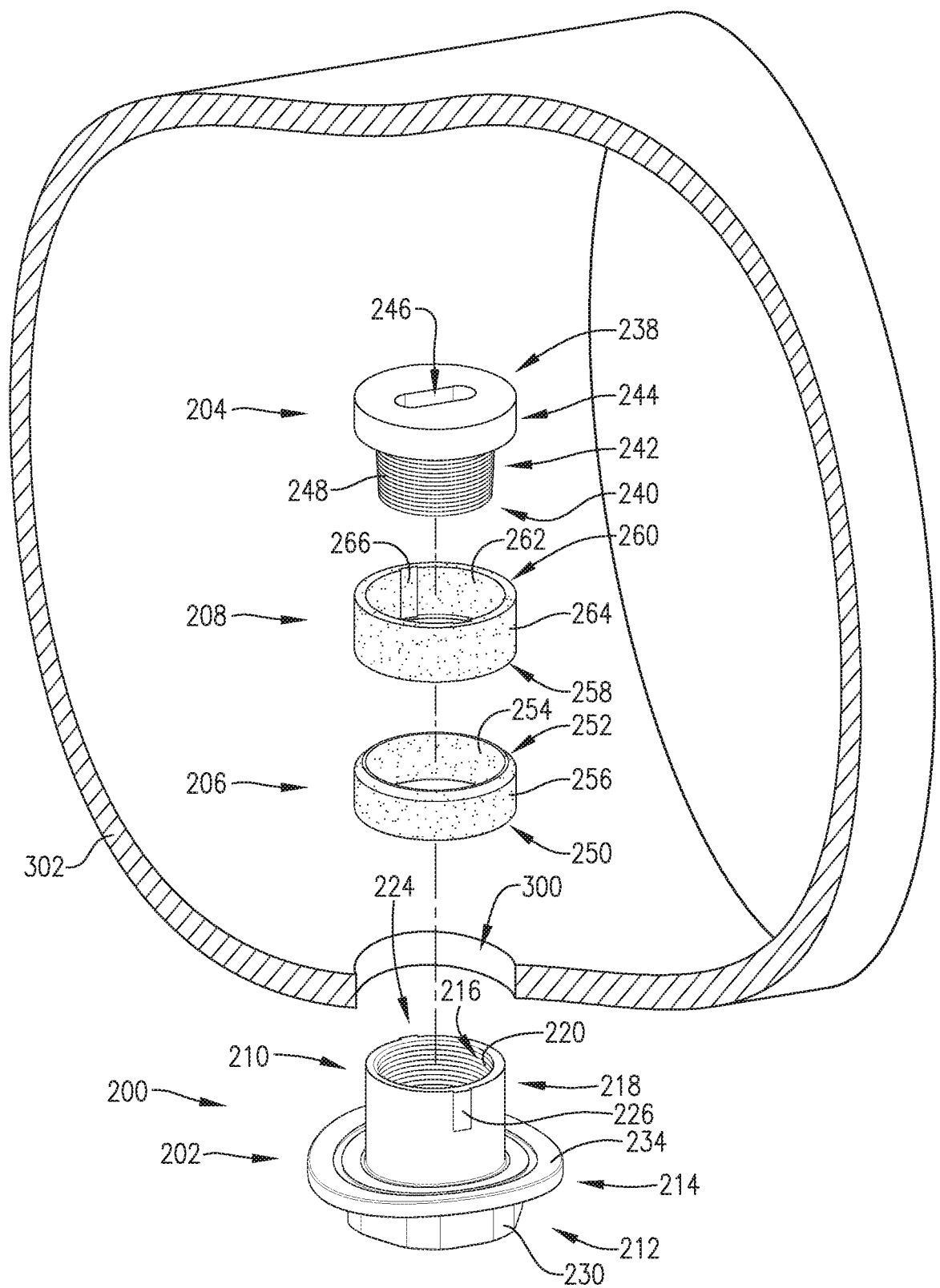
FIG. 6 is an exploded view of an outlet fitting constructed in accordance with another embodiment of the invention.
Figure 7:
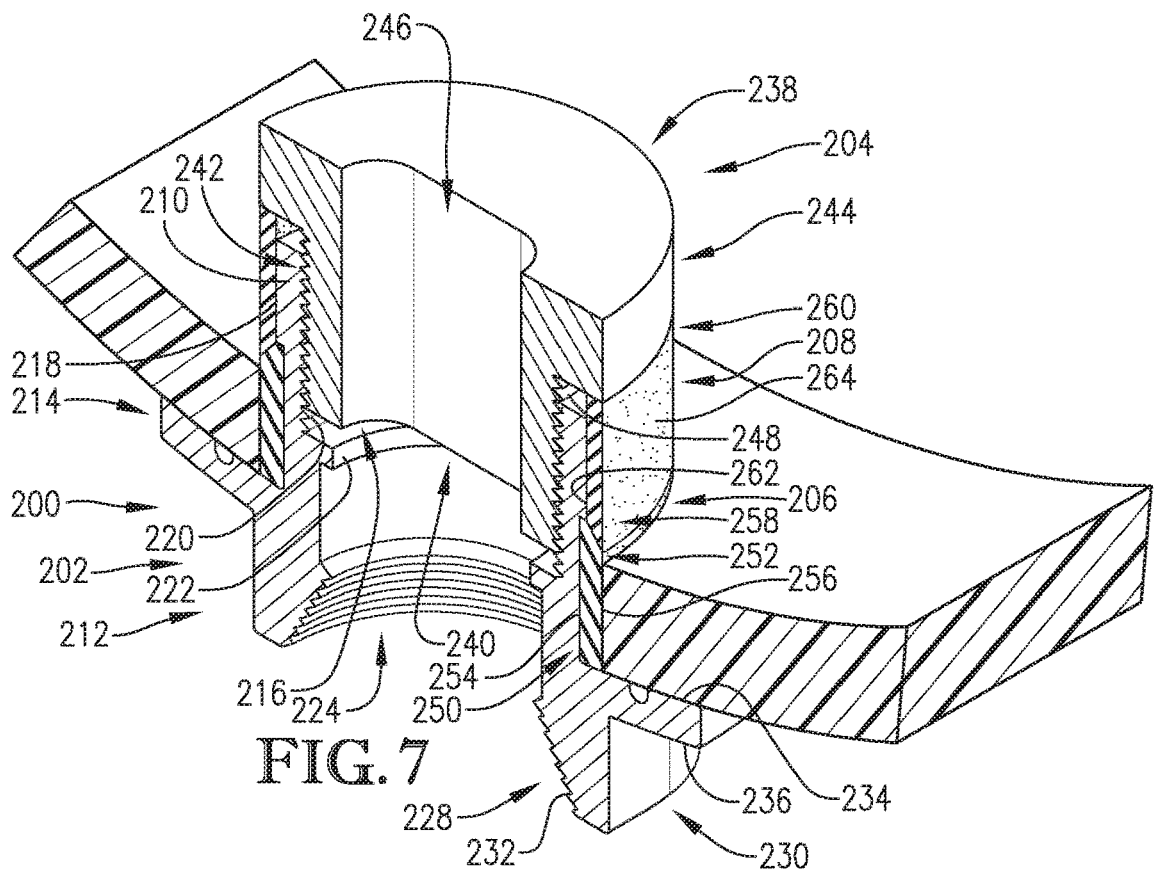
FIG. 7 is a partial cutaway perspective view of the outlet fitting of FIG. 6 unseated in a conduit opening of a conduit.
Figure 8:
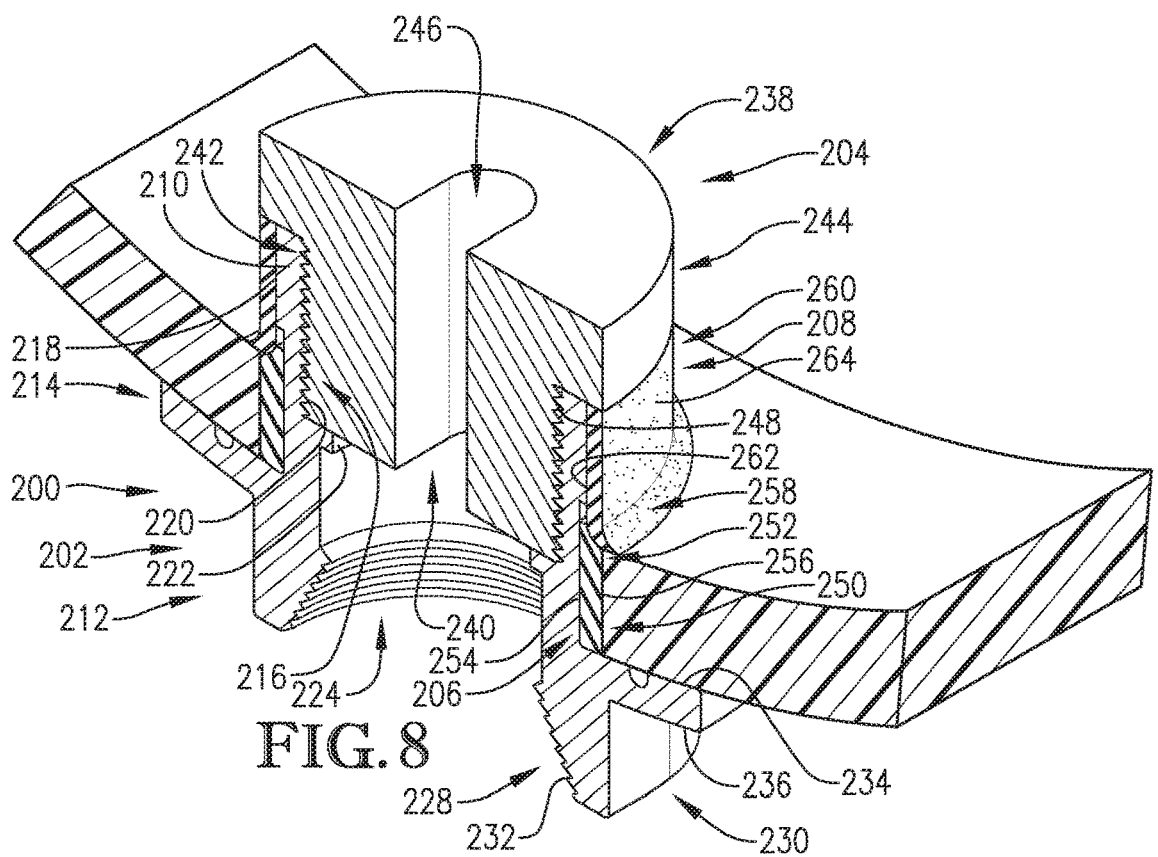
FIG. 8 is a partial cutaway perspective view of the outlet fitting of FIG. 7 seated in the conduit opening of the conduit.

Turning to FIGS. 6-8, an outlet fitting 200 constructed in accordance with another embodiment of the invention is illustrated. The outlet fitting 200 broadly comprises a coupler 202, a plug 204, a gasket 206, and a flare collar 208.

The coupler 202 engages and fits within a conduit opening 300 of a conduit 302 and broadly comprises an aft section 210, a forward section 212, and a radially extending flange 214 that bisects the aft and forward sections 210, 212. The aft section 210 includes an inner surface 216 and an outer surface 218. The inner surface 216 includes plug engaging geometry 220 and an inwardly extending stop 222 and forms a fluid passageway 224. The inner surface 216 may have a substantially uniform diameter. The plug engaging geometry 220 may be helical threading, radially extending barbs (similar to hose barbs), a radially extending neck, or other similar geometry for engaging outer features of the plug 204. The stop 222 is positioned near a forward end of the plug engaging geometry 220 and may be a flange, lip, protrusion, or other similar geometry. The fluid passageway 224 extends through the coupler 12 for allowing fluid to pass therethrough.

The outer surface 218 includes a guide 226 for maintaining rotational alignment of the flare collar 208 with the coupler 202 and may be a ridge, nub, pin, groove, slot, or any other suitable alignment geometry. The outer surface 218 may be circular or any other suitable shape to match the shape of the conduit opening 300.

The forward section 212 extends from the aft section 210 and also includes an inner surface 228 and an outer surface 230. The inner surface 228 may include connecting geometry 232 for connecting a fluid emitter (e.g., sprinkler, valve, hose, hose connector, etc.) to the coupler 202. The inner surface 228 fluidly extends from the inner surface 216 of the aft section 210 such that the fluid passageway 224 extends entirely through the coupler 202. The connecting geometry 232 may be helical threading, hose barbs, or any other suitable connector. The outer surface 230 may have a polygonal shape with several straight sides or any other suitable shape so it can be gripped by a wrench or other tool as described below.

The flange 214 extends radially outwardly from between the aft section 210 and forward section 212 and has opposing upper and lower surfaces 234, 236. The upper surface abuts the conduit 302 and may be saddle shaped for conforming to a cylindrical shape of the conduit 302. The saddle shape may also prevent rotation of the coupler in the conduit opening 300 of the conduit 302.

The plug 204 broadly comprises opposing aft and forward ends 238, 240, an outer surface 242, a flange 244, and a central aperture 246. The aft and forward ends 238, 240 may be circular or otherwise match the geometry of the inner surface 216 of the aft section 210 of the coupler 202. The outer surface 242 extends between the aft end 238 and forward end 240 and may include coupler engaging geometry 248 such as helical threading, radially extending barbs (similar to hose barbs), a radially extending neck, or other similar geometry for engaging the plug engaging geometry 220 of the inner surface 216 of the coupler 202. The outer surface 242 may have a substantially uniform diameter. The flange 244 extends radially from the plug 204 near the aft end 238 and is configured to engage a distal end of the flare collar 208.

The central aperture 246 extends longitudinally through the plug 204 from the aft end 238 to the forward end 240 for allowing fluid to pass therethrough and is configured to receive an end of a tool therein for urging the plug 204 towards the forward section 212 of the coupler 202. To that end, the central aperture 246 may be laterally elongated or may have other geometry for being rotationally engaged by the tool. Alternatively, the central aperture 246 may allow the tool to be inserted therethrough so that features of the tool may engage the aft end 238 of the plug 204.

The gasket 206 includes proximal and distal ends 250, 252 and inner and outer surfaces 254, 256. The outer surface 256 may taper towards the inner surface 254 near the distal end 252. The gasket 206 may be an O-ring, sealant, or any other suitable component configured to form a seal between the coupler 202 and the outer wall 306 of the conduit 302.

The flare collar 208 is configured to be positioned around the aft section 210 of the coupler 202 and may include opposing proximal and distal ends 258, 260 and opposing inner and outer surfaces 262, 264. The inner surface 240 includes alignment geometry 266 and may taper outwardly towards the outer surface 264 near the proximal end 258. The alignment geometry 266 is configured to engage the guide 226 of the coupler 202 and may be a ridge, nub, pin, groove, slot, or any other suitable alignment geometry. The flare collar 208 may have an outer diameter similar to an outer diameter of the flange 244 of the plug 204 and an outer diameter of the gasket 206. The flare collar 208 may be formed of any suitable non-corrosive, malleable or deformable material such as a metal or plastic.

Use of the outlet fitting 200 will now be described in more detail. First, the gasket 206 and the flare collar 208 may be positioned around the aft section 210 of the coupler 202 such that the proximal end 258 of the flare collar 208 is near the distal end 252 of the gasket 206. The plug 204 may also be partially inserted into the aft section 210 of the coupler 202 such that the flange 244 of the plug 204 is positioned near the distal end 260 of the flare collar 208. The aft section 210 of the coupler 202, the plug 204, the gasket 206, and the flare collar 208 may then be inserted into the conduit opening 300 such that the flange 214 of the coupler 202 is positioned against the outside of the conduit 302 and the gasket 206 is adjacent the periphery 304 of the opening 300 (FIG. 7). Since the plug 204 is only partially threaded into the coupler 202 at this point, it has not forced the proximal end 258 of the flare collar 208 to expand over the gasket 206 yet, so the coupler 202 and plug 204 within the conduit opening 300.

A tool such as a flathead screwdriver may then be inserted into the central aperture 246 and rotated to pull the plug 204 further into the aft section 210 of the coupler 202. As the plug 204 is pulled further into the coupler 202, the flange 244 of the plug 204 engages the distal end 260 of the flare collar 208 so as to urge the proximal end 258 of the flare collar 208 against the gasket 206. The inwardly tapered distal end 252 of the gasket 206 in turn urges the outwardly tapered proximal end 258 of the flare collar 208 outward such that the flared end of the flare collar 208 positively secures the coupler 202 in the conduit opening 300 (FIG. 8).

The flare collar 208 may also axially compress the gasket 206 so as to radially expand the gasket 206 against the periphery 304 of the conduit opening 300 such that the gasket 206 forms a seal between the coupler 202 and the conduit opening 300. The gasket 206 may morph around the periphery 304 of the conduit opening 300 so as to form a more secure seal. The seal may withstand up to 120 pounds per square inch of pressure.

A fluid emitter may then be connected to the forward section 212 of the coupler 202 via the connecting geometry 232. For example, a sprinkler may be attached to the connecting geometry 232 of the forward section 212 by tightening a connector of the sprinkler onto helical threading of the forward section 212.

In some embodiments in which the coupler 202 and the plug 204 engage each other with geometry other than helical threading, the tool may be T-shaped or L-shaped and may be inserted through the central aperture 246 and turned so that the end of the tool engages the aft end 238 of the plug 204. The tool may then be pulled towards the forward section 212 of the coupler 202 to shift the plug 204 towards the forward section 212. The engaging geometry of the coupler 202 and plug 204 will prevent the plug 204 from backing out of the coupler 202 so as to secure the coupler 202 in the conduit opening 300.

The above-described outlet fitting 200 provides several advantages over conventional fittings. For example, the outlet fitting 200 can be attached completely from the outside of the conduit 302 without the use of complicated tools or procedures. The outlet fitting 200 can be attached to the conduit 302 without welding, heat sealing, or any other expensive or time consuming treatment. The outlet fitting 200 can be inserted into the conduit opening 300 as a cohesive assembly, which ensures that individual components of the assembly do not separate and become loose or lost inside the conduit 302. The flare collar 208 positively secures the coupler 202 in the conduit opening 300. The outlet fitting 200 ensures a homogenous seal and does not develop failure points or leaks.

Figure 9:
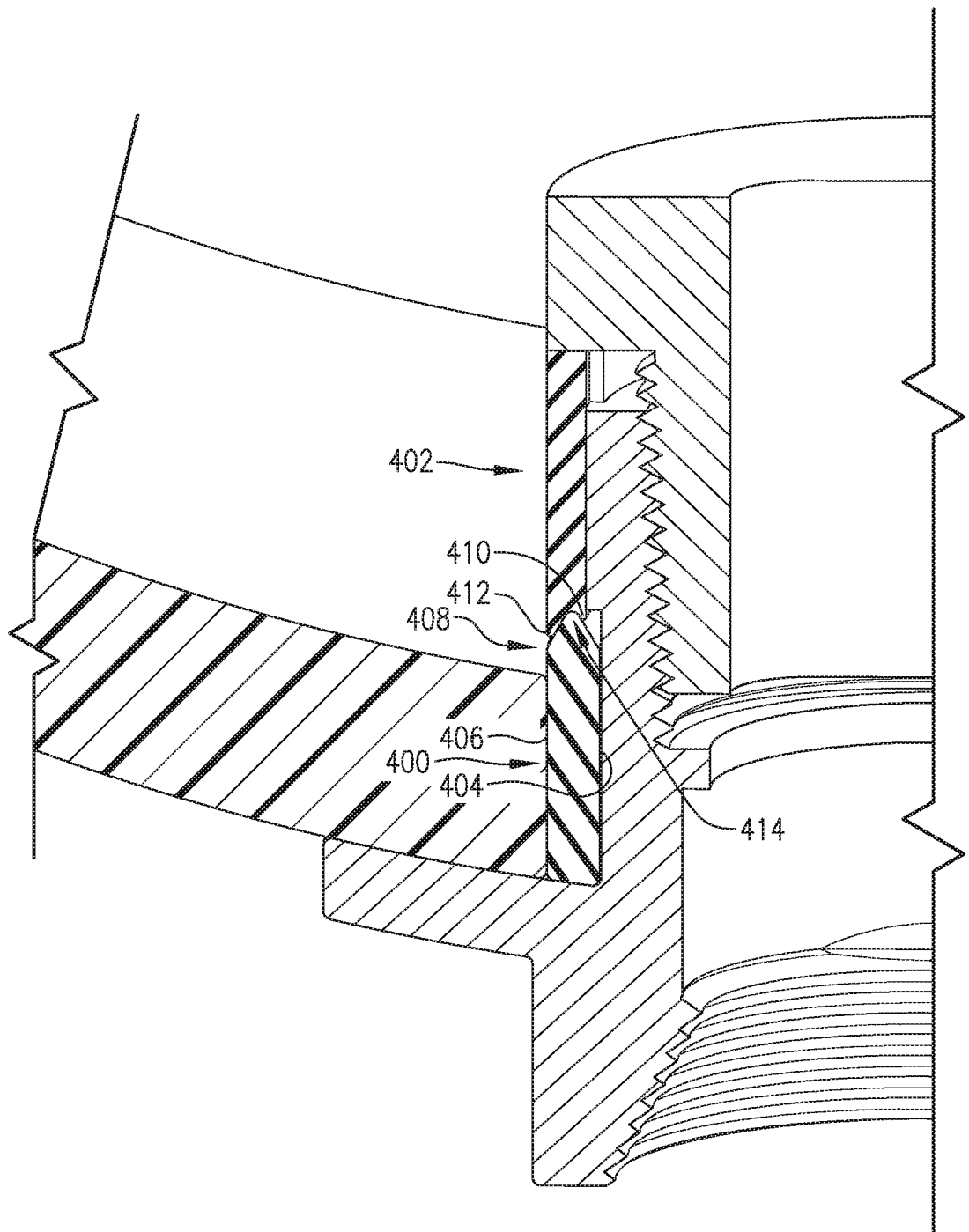
FIG. 9 is an enlarged cutaway perspective view of an outlet fitting constructed in accordance with another embodiment of the invention.

Another embodiment of the invention is similar to the outlet fitting 200 described above except that gasket 400 and flare collar 402 form interlocking geometry, as shown in FIG. 9. Gasket 400 includes an inner surface 404 and an outer surface 406 that taper towards each other at distal end 408. Flare collar 402 includes an inner annular protrusion 410 and an outer annular protrusion 412 divided by a tapered indentation 414. The inner annular protrusion 410 is configured to engage the tapered portion of the inner surface 364 of the gasket 400 and the outer annular protrusion 412 is configured to be flared radially outwardly by the tapered portion of the outer surface 366 while the tapered indentation 414 receives the distal end 408 of the gasket 400. This improves axial compression and radial expansion of the gasket 400, which improves the seal formed by the gasket 400.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An outlet fitting for a conduit opening of a pressurized fluid-carrying cylindrical conduit including an outer wall having an outer surface annularly circular and longitudinally straight near the conduit opening, the outlet fitting comprising:
   a coupler comprising:
      an aft section configured to be inserted into the conduit opening, the aft section having an inner surface, an outer surface, and a distal end, a portion of the inner surface decreasing in diameter away from the distal end;
      a forward section extending from the aft section and having an inner surface and an outer surface, the forward section being configured to connect a fluid emitter to the coupler,
      the inner surfaces of the aft section and forward section forming a fluid passageway extending through the coupler; and
      a radially extending flange bisecting the aft and forward sections, the flange including a conduit-facing surface having no curvature in a first direction and a constant curvature in a second direction orthogonal to the first direction such that an entirety of the conduit-facing surface is configured to abut the outer surface of the conduit near the conduit opening; and
   a plug configured to be at least partially positioned in the aft section of the coupler, the plug having an aft end and a forward end, the plug comprising:
      a frusto-conical shaped outer surface widening in diameter towards the aft end; and
      a central aperture extending through the plug from the aft end to the forward end for allowing fluid to pass therethrough,
      the plug being configured to be drawn into the aft section of the coupler so as to radially expand the aft section such that at least a portion of the outer surface of the aft section secures the coupler in the conduit opening and creates a seal between the coupler and the conduit, wherein the outer surface of the aft section includes a radially extending lip configured to positively secure the coupler in the conduit opening when the aft section is radially expanded, the coupler including the radially extending lip being monolithic.

2. The outlet fitting of claim 1, the inner surface of the aft section having helical threading and the frusto-conical shaped outer surface of the plug having helical threading configured to engage the helical threading of the inner surface of the aft section, the central aperture of the plug being configured to be rotationally engaged by a tool such that the plug is drawn towards the forward section of the coupler.

3. The outlet fitting of claim 2, wherein the central aperture is a laterally elongated slot.

4. The outlet fitting of claim 1, wherein the plug is configured to allow fluid to pass only through the central aperture.

5. The outlet fitting of claim 1, wherein the outer surface of the aft section is circular.

6. The outlet fitting of claim 1, further comprising a gasket positioned annularly around the outer surface of the aft section and configured to engage the conduit near the conduit opening when the plug is drawn into the aft section of the coupler so as to form the seal between the coupler and the conduit.

7. The outlet fitting of claim 6, wherein the outer surface of the aft section includes an annular groove configured to receive the gasket therein.

8. The outlet fitting of claim 1, wherein the inner surface of the forward section includes helical threading for connecting the fluid emitter to the conduit.

9. The outlet fitting of claim 1, wherein the seal is configured to withstand 120 pounds per square inch of pressure.

10. An outlet fitting for a conduit opening of a pressurized fluid-carrying cylindrical conduit including an outer wall having an outer surface, the outer surface being annularly circular and longitudinally straight near the conduit opening, the outlet fitting comprising:
   a coupler comprising:
      an aft section configured to be inserted into the conduit opening, the aft section having an inner surface, an outer surface, and a distal end, a portion of the inner surface having helical threading and decreasing in diameter away from the distal end, the outer surface including a groove and a radially extending lip, the coupler including the radially extending lip being monolithic;
      a forward section extending from the aft section, the forward section being configured to connect a fluid emitter to the coupler, the inner surfaces of the aft section and forward section forming a fluid passageway extending through the coupler; and
      a radially extending flange bisecting the aft section and forward section, the flange including a conduit-facing surface having no curvature in a first direction and a constant curvature in a second direction orthogonal to the first direction such that an entirety of the conduit-facing surface is configured to abut the outer surface of the conduit near the conduit opening;

a plug configured to be at least partially positioned in the aft section of the coupler, the plug having an aft end and a forward end, the plug comprising:
- a frusto-conical shaped outer surface widening in diameter towards the aft end, the frusto-conical shaped outer surface including helical threading configured to engage the helical threading of the inner surface of the aft end of the coupler; and
- a laterally elongated central aperture extending through the plug from the aft end to the forward end for allowing fluid to pass only through the central aperture; and a gasket positioned annularly around the outer surface of the aft section and configured to engage the outer wall of the conduit, the radially extending lip retaining the gasket in the groove, the plug being configured to be drawn into the aft section of the coupler when a tool rotates the plug via the central aperture so as to radially expand the aft section such that the radially extending lip positively secures the coupler in the conduit opening and urges the gasket against the conduit so as to create a seal between the coupler and the conduit.

\* \* \* \* \*